United States Patent [19]
Suzuki

[11] Patent Number: 6,058,996
[45] Date of Patent: May 9, 2000

[54] PNEUMATIC RADIAL TIRE WITH FULL-WIDTH BAND AND AXIALLY SPACED EDGE BANDS

[75] Inventor: Toshiaki Suzuki, Ashiya, Japan

[73] Assignee: Sumitomo Rubber Industries, Inc., Kobe, Japan

[21] Appl. No.: 08/797,309

[22] Filed: Feb. 7, 1997

[30] Foreign Application Priority Data

Feb. 15, 1996 [JP] Japan ...................................... 8-27885
Dec. 9, 1996 [JP] Japan .................................... 8-328657

[51] Int. Cl.[7] .............................. B60C 3/00; B60C 9/18; B60C 9/20; B60C 9/22
[52] U.S. Cl. ................. 152/527; 152/209.1; 152/209.14; 152/454; 152/531; 152/533; 152/538
[58] Field of Search ..................... 152/527, 531, 152/533, 454, 538, 209.1, 209.14

[56] References Cited

FOREIGN PATENT DOCUMENTS

| | | |
|---|---|---|
| 0335588A2 | 10/1989 | European Pat. Off. . |
| 0353659A2 | 2/1990 | European Pat. Off. . |
| 0385639A1 | 9/1990 | European Pat. Off. . |
| 0504698A1 | 9/1992 | European Pat. Off. . |
| 4209817A1 | 9/1993 | Germany . |
| 2092964 | 8/1982 | United Kingdom . |

OTHER PUBLICATIONS

Patent Abstracts of Japan, vol. 016, No. 044 (M–1207) Feb. 4, 1992 (Abstract of JP 03 248902A) (Toyo Tire & Rubber Co. Ltd., Nov. 6, 1991).

*Primary Examiner*—Adrienne Johnstone

[57] ABSTRACT

A pneumatic radial tire comprises a breaker belt disposed radially outside the carcass having at least two cross plies of high elastic modulus cords laid at an inclination angle of from 15 to 30 degrees with respect to the tire equator, and a band belt disposed radially outside the breaker belt and comprising a full-width band and a pair of axially spaced edge bands, wherein the full-width band is made of low elastic modulus organic fiber cords arranged substantially parallel to the tire equator. The edge bands are made of high modulus organic fiber cords arranged substantially parallel to the tire equator, whereby the high speed durability and cornering performance are improved.

4 Claims, 7 Drawing Sheets

COMPARATIVE

PNEUMATIC RADIAL TIRE WITH FULL-WIDTH BAND AND AXIALLY SPACED EDGE BANDS

BACKGROUND OF THE PRESENT INVENTION

1) Field of the Invention

The present invention relates to a pneumatic radial tire having an improved belt being capable of improving the high speed durability and cornering performance.

2) Description of the Related Art

In a conventional radial tire having a tread portion that is reinforced with a breaker belt, the breaker belt may be subjected to a large centrifugal force during high speed running causing the breaker belt to be lifted and in turn, making a belt edge separation failure more likely to occur. Thus, the tire durability likely is to decrease, particularly when steel cords are used in the breaker belt.

Japanese laid-open patent application No. 63-315305 describes a conventional system for preventing the breaker belt from lifting. In that conventional system the tire is provided with a full-width band that extends over the full width of the breaker and a pair of edge bands that are disposed in only the edge portions of the breaker. Furthermore, each band is made of nylon cords.

In this system, however, the bands cannot fully control the lifting of the breaker edge portions since the bands are made of a low elastic modulus cord. Thus, in the conventional system, the breaker edge is likely to life or become loose, thereby decreasing the high speed durability. This problem is experienced commonly in pneumatic tires for high performance passenger cars such as sport cars.

If the full-width band and edge bands are made of a high elastic modulus cord, the ground contacting area becomes substantially rectangular in shape at high speeds, as shown in shape (b) of FIG. 9(b), rather than barrel-like shaped as shown in shape (a) of FIG. 9(a). As a result, when cornering, the rectangular shape (b) is changed to a trapezoidal shape (b1), as shown via the broken line of FIG. 9(b), greatly decreasing the ground contacting area. Thus, transitional cornering characteristics of the tire are liable to change greatly, and slip is liable to occur during cornering. On the other hand, although the ground contacting area having the barrel-like shape (a) is also changed to a trapezoidal shape (a1) at the time of cornering, as shown via the broken line of FIG. 9(a), the decrease in the ground contacting area is relatively small and thus the cornering performance is not deteriorated.

SUMMARY OF THE INVENTION

It is an object of the present invention to provide a pneumatic radial tire having a full-width band and edge bands which provide a barrel-shaped ground contacting area and thus improve the high speed durability and cornering performance.

According to the present invention, the pneumatic radial tire includes a tread portion, a pair of sidewall portions, a pair of bead portions each with a bead core therein, a radial carcass extending between the bead portions through the tread portion and sidewall portions and being turned up around the bead cores in the bead portions, a breaker belt disposed radially outside the carcass and inside the tread portion and comprising at least two cross plies of high elastic modulus cords laid at an inclination angle of from 15 to 30 degrees with respect to the tire equator, and a band disposed radially outside the breaker belt and comprising a full-width band and a pair of axially spaced edge bands, wherein the full-width band is made of low elastic modulus organic fiber cords arranged substantially parallel to the tire equator and extends to cover the substantially full width of the breaker belt, and the edge bands are made of high modulus organic fiber cords arranged substantially parallel to the tire equator and extend to cover only the edge portions of the breaker.

Preferably, organic fiber cords that have a tensile elastic modulus of less than 1000 kg/sq.mm are used for the low modulus cords. Used for the high modulus cords are either organic fiber cords that have a tensile elastic modulus of not less than 1000 kg/sq.mm or hybrid cords formed by twisting together an organic fiber strand that has a tensile elastic modulus of not less than 1000 kg/sq.mm and an organic fiber strand that has a tensile elastic modulus of less than 1000 kg/sq.mm.

The edge bands are preferably disposed radially inside the full-width band.

BRIEF DESCRIPTION OF THE DRAWINGS

Taking a pneumatic radial tire for passenger cars as an example, an embodiment of the present invention will now be described in detail in conjunction with the accompanying drawings, in which.

DETAILED DESCRIPTION OF A PREFERRED EMBODIMENT

Figure 1:
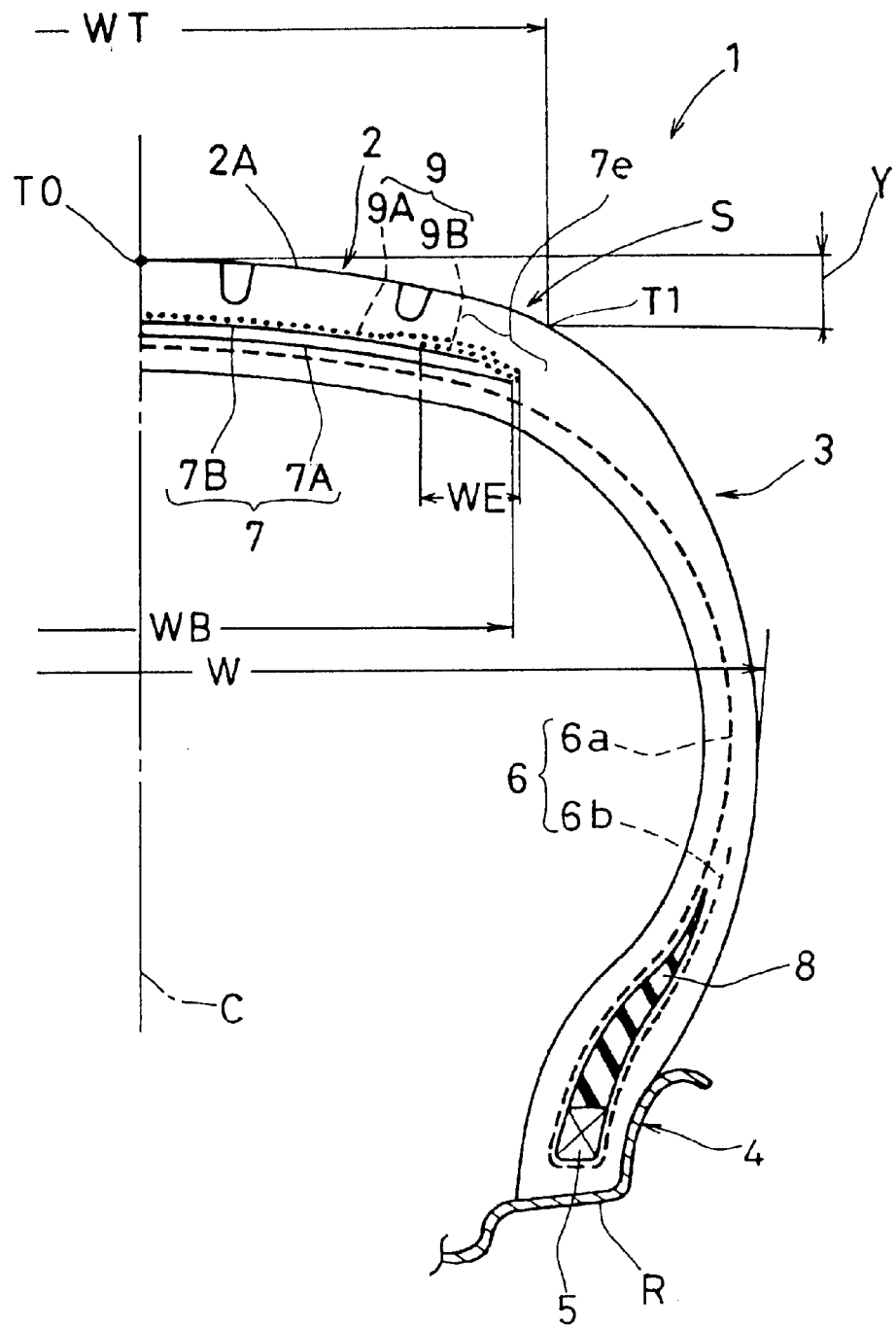
FIG. 1 is a cross-sectional view of an embodiment of the present invention.

In the drawings, the pneumatic radial tire 1 according to the present invention includes a tread portion 2, a pair of sidewall portions 3, a pair of bead portions 4 with a bead core 5 therein, a carcass 6, a breaker belt 7, and a band belt 9. The carcass 6 extends between the bead portions 4 through the tread portion 2 and sidewall portions 3. It is turned up around the bead cores 5 from the axially inside to the outside of the tire to form a pair of turnup portions 6b and a main portion 6a therebetween. Breaker belt 7 is disposed radially outside the carcass 6 and inside the tread portion 2. Band belt 9 is radially outside the breaker belt 7.

The tire shown in FIG. 1 is in a normal unloaded state in which the tire is mounted on a standard rim R and inflated to a maximum pressure, without applying a load. The standard rim R is a rim officially approved for the tire by, for example, JATMA (Japan), TRA (USA), ETRTO (Europe) and the like. The maximum pressure is that specified in the same association.

In a meridian section of the tire, the profile line of the tread portion 2 is curved concavely so that the camber quantity Y is in a range of 4.0 to 5.0% of the section width W of the tire or 5.0 to 6.5% of the ground contacting width WT. If the camber quantity Y is less than 4.0% of the section width W and less than 5.0% of the ground contacting width WT, the ground pressure increases in the tread shoulder region S and a heat generation is increased. As a result, the high speed durability is decreased, and a running noise from the tire increases. On the other hand, if the camber quantity Y is more than 5.0% of the section width W and more than 6.5% of the ground contacting width WT, the high speed straight running stability and high speed durability are increased, but the slow speed running steering stability decreases.

The camber quantity Y is the radial distance between the tire equator tread profile point To and tread profile edge point T1. The tread profile edge point T1 is the axially outermost edge T1 of the ground contacting area under a standard loaded state in which the tire is mounted on the standard rim R and inflated to the maximum pressure and loaded with a maximum load. For convenience, instead of the actual tire section width W, the nominal tire width may be expressed using a metric tire size designation such as 225/65R16, as specified in, for example, Japanese industrial standard JIS-D4201.

The above-mentioned carcass 6 comprises one or more plies. In this embodiment, only one ply of cords is arranged radially at an angle of from 90 to 75 degrees with respect to the tire equator C. For the carcass cords, organic fiber cords, e.g. polyester, nylon, rayon, aromatic polyamide and the like can be used. Preferably, at least one carcass ply is formed in a high-turnup structure such that each of the turnup portions 6b is higher than a bead apex 8. The bead apex 8 is disposed between the main portion 6a and each turnup portion 6b of the carcass 6. The bead apex 8 is made of hard rubber that is tapered radially outward from the bead core 5.

The breaker belt 7 comprises two or more plies. In this embodiment, the breaker belt 7 consists of two cross plies, a radially inner ply 7A disposed on the carcass 6 and a radially outer ply 7B disposed radially outside the inner ply 7A. Each of the breaker plies 7A and 7B is composed of high elastic modulus cords 11 laid at an angle of from 15 to 30 degrees with respect to the tire equator C, and positioned in parallel with each other but crosswise to the cords of the next ply. To improve the steering stability, steel cords are preferably used for the breaker belt cords 11, but inextensible organic fiber cords such as aromatic polyamide cords can also be used. Both the inner and outer breaker plies 7A and 7B are known as cut-end plies, in which the axial edge is not folded. The axial width WB of the inner breaker ply 7A is set in the range of from 0.8 to 1.1 times the ground contacting width WT. The outer breaker ply 7B is narrower in width than the inner breaker ply 7A in order to avoid stress concentration.

If the inclination angle of the breaker cords 11 is more than 30 degrees, the steering stability is improved at slow running speeds. However, the rigidity of the tread portion 2 decreases to decrease the straight running stability and durability at high speed, and to compound noise increases experienced at high speeds. If the angle is less than 15 degrees, the rigidity of the tread portion 2 excessively increases, and the steering stability at a slow running speed is decreased.

The above-mentioned band belt 9 comprises a full-width band 9A extending over the substantially full width of the breaker belt 7, and a pair of edge bands 9B axially spaced from each other to extend over only the edge portions 7e of the breaker belt 7. The edge bands in this example are disposed between the breaker belt 7 and the full-width band 9A.

Figure 4:
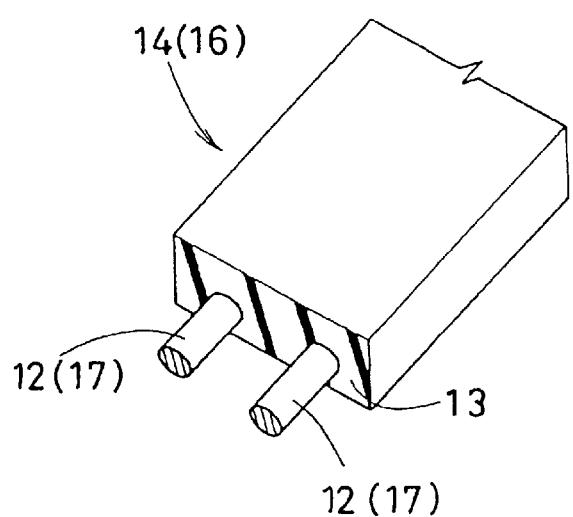
FIG. 4 is a perspective view showing an example of a ribbon of rubber.
Figure 3:
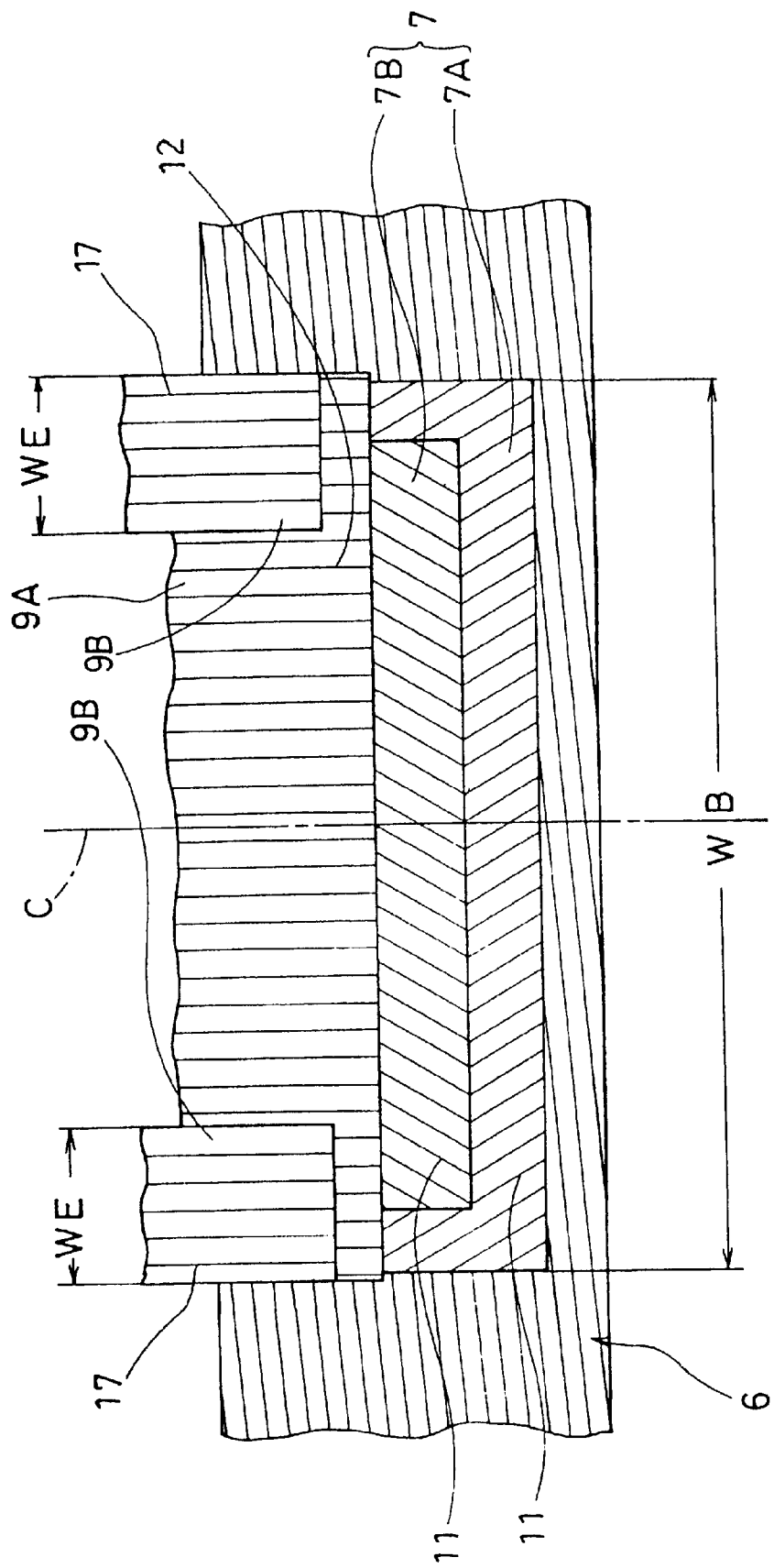
FIG. 3 is a developed plan view showing the breaker belt and bands.

The full-width band 9A is formed by spirally winding a ribbon 14 of rubber 13 in which low modulus organic fiber cords 12 are embedded in parallel with each other as shown in FIG. 4. In this arrangement, each cord 12 forms an angle of substantially zero with respect to the tire equator C.

The edge bands 9B are formed by spirally winding a ribbon 16 of rubber 13 in which high modulus organic fiber cords 17 are embedded in parallel with each other so that each cord forms substantially zero angle with respect to the tire equator C.

Each of the edge bands 9B covers an edge portion 7e of the breaker 7. That is, each of the edge band, 9B covers both an edge of the outer breaker ply 7B and an edge of the inner breaker ply 7A protruding axially outwardly therefrom.

The width WE of each edge band 9B is set to be within at least one of the following ranges:

(a) 10 to 20% of the section width W of the tire, and
(b) 13 to 26% of the ground contacting width WT.

The edges of the full-width band 9A and the axial outer edges of the edge bands 9B are substantially aligned with the edges of the inner breaker ply 7A so that the distance of each of the band edges measured axially outwardly from the edge of the inner breaker ply 7A is in the range of from 0 to 3 mm.

For the low modulus cords 12, organic fiber cords (e.g. nylon, rayon, polyester and the like) having a tensile elastic modulus of less than 1000 kg/sq.mm can be used. Preferably, a nylon fiber cord, which is superior in bending resistance and processability, is used.

For the high modulus cords 17, organic fiber cords (e.g. vinylon, aromatic polyamide and the like) having a tensile elastic modulus of not less than 1000 kg/sq.mm can be used. Preferably, an aromatic polyamide fiber cord, which is superior in strength and has a high elastic modulus, is used.

Further, for the high modulus cords 17, a hybrid cord can be used, which is formed by twisting together a high modulus organic fiber strand and a low modulus organic fiber strand. The high modulus organic fiber strand has a tensile elastic modulus of not less than 1000 kg/sq.mm. For example, an aromatic polyamide fiber strand is used. The low modulus organic fiber strand has a tensile elastic modulus of less than 1000 kg/sq.mm. For example, a nylon fiber strand is used.

In the present invention, the tensile elastic modulus is determined based on the initial slope of the load-elongation curve of the cord or strand concerned. First, a straight line, which is inclined with the same angle as the load-elongation curve measured at the starting point, is drawn from the starting point. Then, using this straight line, the load L corresponding to an elongation of 10% is obtained. Further, using the following equation (1), the tensile elastic modulus is calculated based on the following relationship:

Tensile elastic modulus $=(L \times 10)So$, wherein So is the cross section area of the cord or strand.

For instance, the tensile elastic modulus and other physical characteristics of various cords are as follows.

TABLE 1

|  | unit | steel | rayon | polyester | vinylon | aramid | 66 nylon |
| --- | --- | --- | --- | --- | --- | --- | --- |
| Tensile elastic modulus | kg/sq.mm | 16680 | 829 | 800 | 1235 | 4500 | 200 |
| Tensile strength | kg/sq.mm | 275 | 60 | 74 | 72 | 218 | 70 |
| Elongation when broken | % | 2 | 13 | 10 | 10 | 6 | — |
| Strength per denier | g/D | 3.9 | 4.4 | 6.0 | 6.0 | 16.9 | 5.6 |
| Specific gravity |  | 7.86 | 1.52 | 1.38 | 1.28 | 1.44 | 1.14 |

As explained above, since the edge bands 9B are made of high elastic modulus cords 17, the lifting-up of the breaker edges 7e can be effectively controlled to prevent breaker edge looseness and the like.

In the portion of the tread central region located between the edge bands 9B, only. the full-width band 9A of the low modulus cords 12 exists as the band belt 9. Therefore, the lifting-up during high speed running becomes large in the tread central region relative to the tread shoulder regions S. Consequently, the ground pressure decreases in the tread shoulder regions S to reduce the generation of heat. Thus, the high speed durability of the tread shoulder region S is further improved.

Figure 9A:
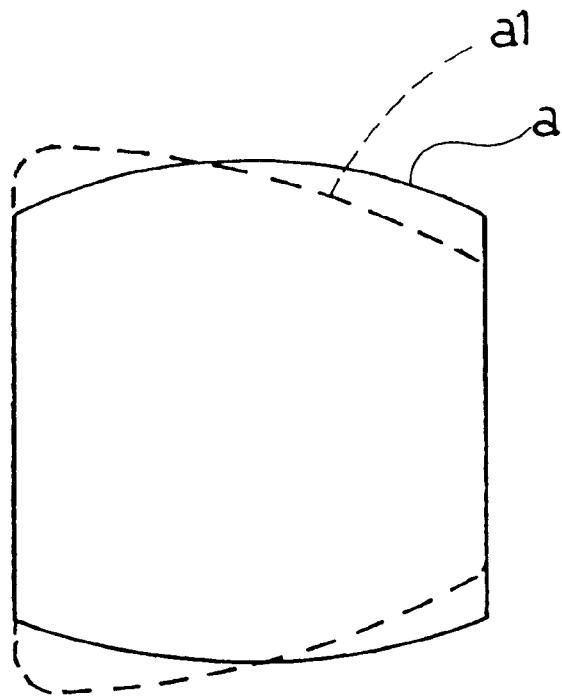
FIG. 9(a) is a diagram showing the ground contacting area of the tire according to the present invention.
Figure 9B:
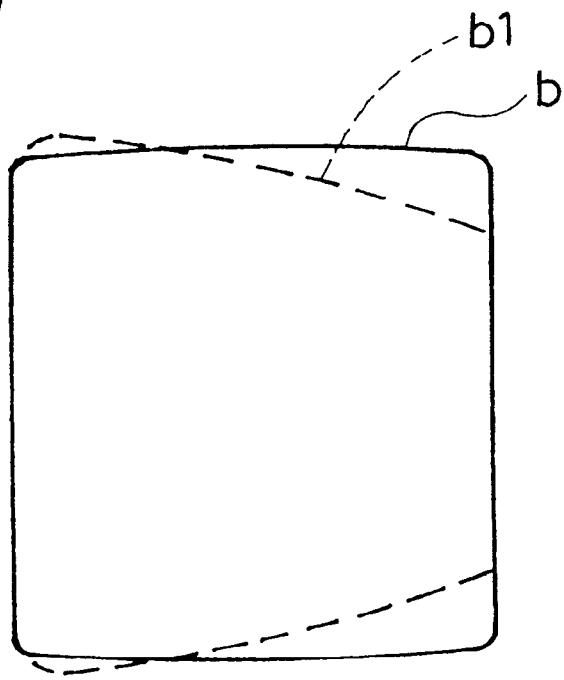
FIG. 9(b) is a diagram showing a ground contacting area of a prior art tire.

Further, as the swelling of the tread portion is relatively large in the central region, the ground contacting area becomes a barrel-like shape, as shown by curve (a) in FIG. 9(a), and a decrease in the ground contacting area at the time of cornering is controlled. Therefore, an accidental slip during cornering and the change in the transitional cornering characteristics can be prevented, and a good cornering performance can be obtained.

If the ply width WE of the edge bands 9B is less than 10% of the section width W of the tire and less than 13% of the ground contacting width WT, the lifting-up of the breaker edge portions 7e during high speed running over 200km/h cannot be fully controlled, and thus the high speed durability decreases. On the other hand, if the width WE is more than 20% of the section width W or 26% of the ground contacting width WT, the high speed straight running performance decreases.

Figure 5:
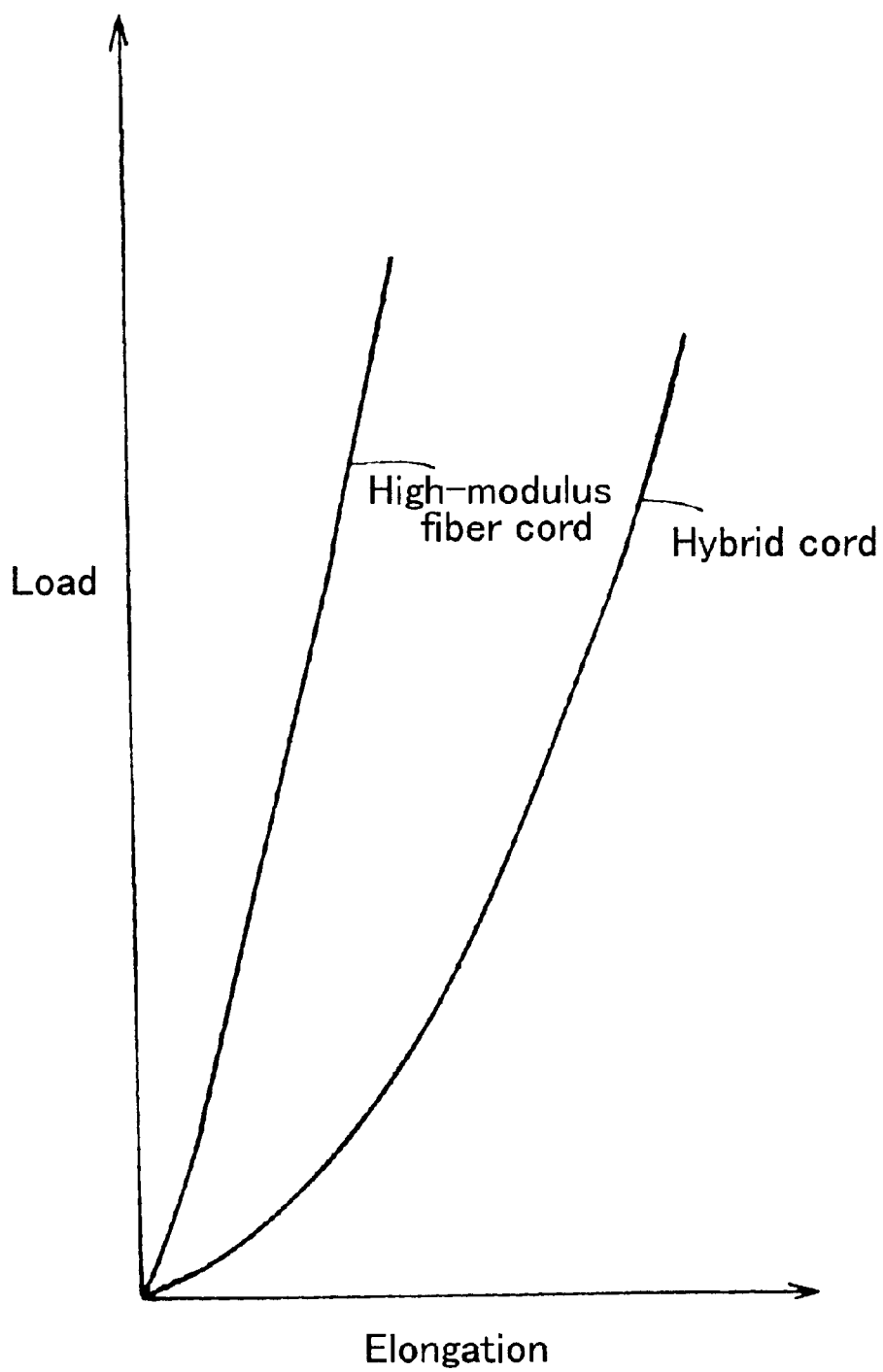
FIG. 5 is a graph showing an example of the load-elongation curve of a hybrid cord and that of a high modulus fiber cord.

During vulcanizing the tire, the breaker cords 11 are pressed to the band cords. Therefore, when the high modulus cord 17 is used in the band belt 9, the space between the cords 11 and 17 in the vulcanized tire decreases, and as a result, the shearing force between the cords 11 and 17 which causes a ply separation failure is likely to increase. In this respect, it is preferable to use a hybrid cord as the high modulus cord 17. In the hybrid cord, the twist numbers of the strands are adjusted such that, in the initial stage of elongation, the load is mainly imposed on the low modulus strand to display a lower modulus, but in the middle and final stage the load is shared with the high modulus strand to display a high modulus, as shown in FIG. 5. As a result, the decrease in the space between the cords 11 and 17 caused during vulcanizing the tire is prevented.

Figure 6:
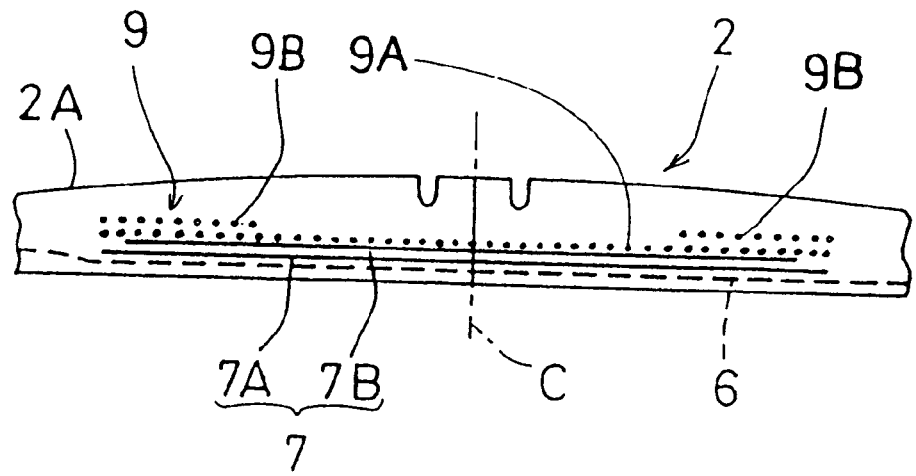
FIG. 6 is a schematic cross-sectional view showing another example of the band.

FIG. 6 shows a modification of the band belt 9, in which the edge bands 9B are disposed radially outside the full-width band 9A.

Preferably, the bands 9A and 9B are each formed by winding at least one continuous cord 12, 17 from one of the edges to the other in view of the uniformity and high speed durability. However, it may be possible to use a cut-end ply, that is, a tire fabric in which cords are laid substantially parallel to the tire equator C.

Comparison Tests

Figure 7:
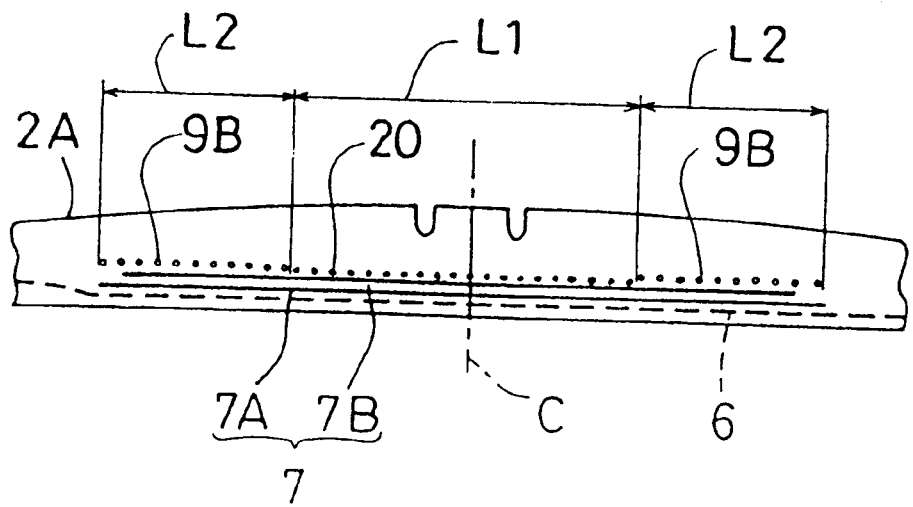
FIG. 7 is a schematic cross-sectional view showing a band structure used in a test tire.

Test tires of size 225/50R16 having the structure shown in FIG. 1, except for the band structure, were made and tested to obtain the following performance test results. The tire specifications and the test results are shown in Table 2. The bands used in the Ref. 3 tire are shown in FIG. 7, in which a narrow-width band 20, which is made of the low modulus cord 12 and extends from one of the axially inner edges of the edge bands 9B to the other, is disposed instead of the full-width band.

(1) High Speed Cornering Performance Test

In a tire test course, a 3000 cc passenger car having the test tires on each of its wheels was run at speeds ranging from 80 to 150 km/h, and the transitional cornering characteristics at a high running speed and the maneuverability during critical running were evaluated into five ranks by the driver's feelings based on the assumption that Ref. 1 is 3 and the larger value is better. The rim size was 16×6JJ and the tire pressure was 3.0 kg/sq.cm.

(2) High Speed Durability Test

Using a 1.7 meter diameter tire test drum, the test tire mounted on a 16×6JJ standard rim and inflated to 3.0 kg/sq.cm was rotated at an initial speed 200 km/h, and the running speed was increased to 240 km/h at a step of 10 km/h/10 minutes. From 240 km/h to 280 km/h, the speed was increased at a step of 10 km/h/20 minutes. And the speed at which the tire was broken and the withstanding time at the speed were measured.

From the above tests, it was confirmed that, in comparison with the reference tires, the example tires were greatly improved in the high speed durability and high speed cornering performance.

In the band belt shown in FIG. 6, however, a separation failure is likely to occur between the tread rubber and the high modulus cord edge bands 9B in comparison with the band belt shown in FIG. 1. Thus, the edge bands 9B are preferably disposed between the breaker belt 7 and the full-width band 9A, as shown in FIG. 1, whereby the ends of the ribbon 16 are covered under the low modulus full-width band 9A. Accordingly, the shearing force of the tread rubber is decreased to improve the durability.

Figure 8:
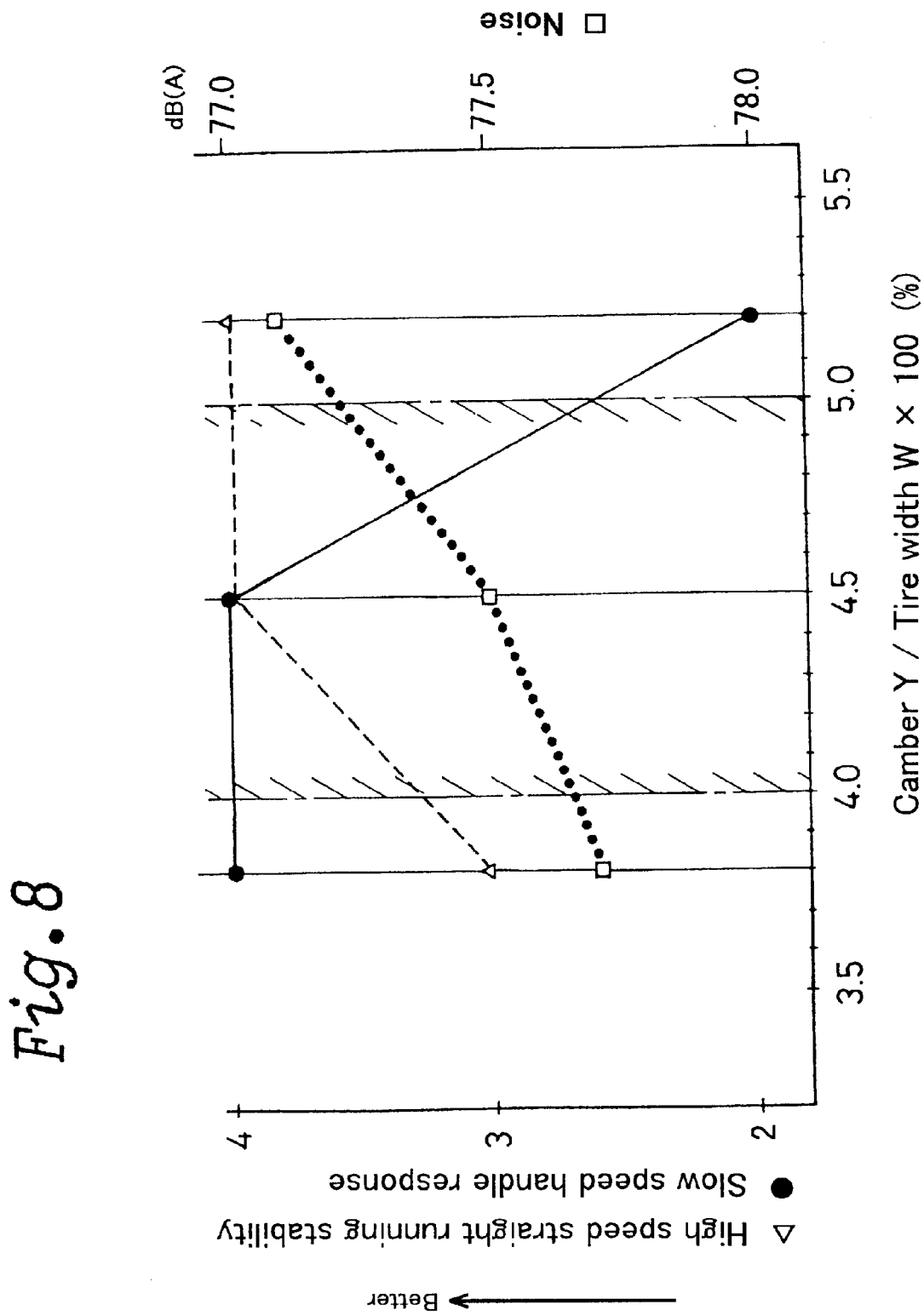
FIG. 8 is a diagram showing relationships between a relative camber quantity and various running performances.

FIG. 8 shows the results of the slow speed handling response test, a high speed straight running stability test and a noise test, as a function of the camber quantity Y. The test tires had the same specifications as the Ex. 1 tire in Table 2 except for the camber quantity Y.

(3) Slow Speed Handling Response Test

Test tires that have the same specifications as the Ex. 1 tire in Table 2, except for the camber quantity Y, were used. A 3000 cc passenger car having the test tires on each of its wheels, mounted on standard rims of the above-mentioned size and inflated to the above-mentioned pressure, was run in a test course at a speed of 0 to 80 km/h, and the handing response was evaluated into five ranks by the driver's feelings, in which the larger value is better.

(4) High Speed Straight Running Stability Test

The test car used in the above-mentioned test (3) was run in a straight test course at a speed of 80 to 150 km/h, and the straight running stability was evaluated into five ranks by the driver's feelings, in which the larger value is better.

(5) Noise Test

The test car used in the above-mentioned test (3) was coasted on a dry asphalt road at a speed of 52.5 km/h, and the overall passing noise was measured with a microphone set at a height of 1.2 meters and 7.5 meter sideways from the center line of the course.

Form the tests (3)–(5), it was confirmed that, by setting the camber Y in the range of from 4.0 to 5.0% of the tire section width W, the slow speed handing response, high speed straight running stability and noise are improved in a well balanced manner.

As described above, the pneumatic radial tire of the present invention is provided radially outside the breaker belt with the band belt which comprises the full-width band made of a low modulus organic fiber cord and the edge bands made of a high modulus organic fiber cord, whereby the high speed durability and cornering performance can be improved.

TABLE 2

Figure 2:
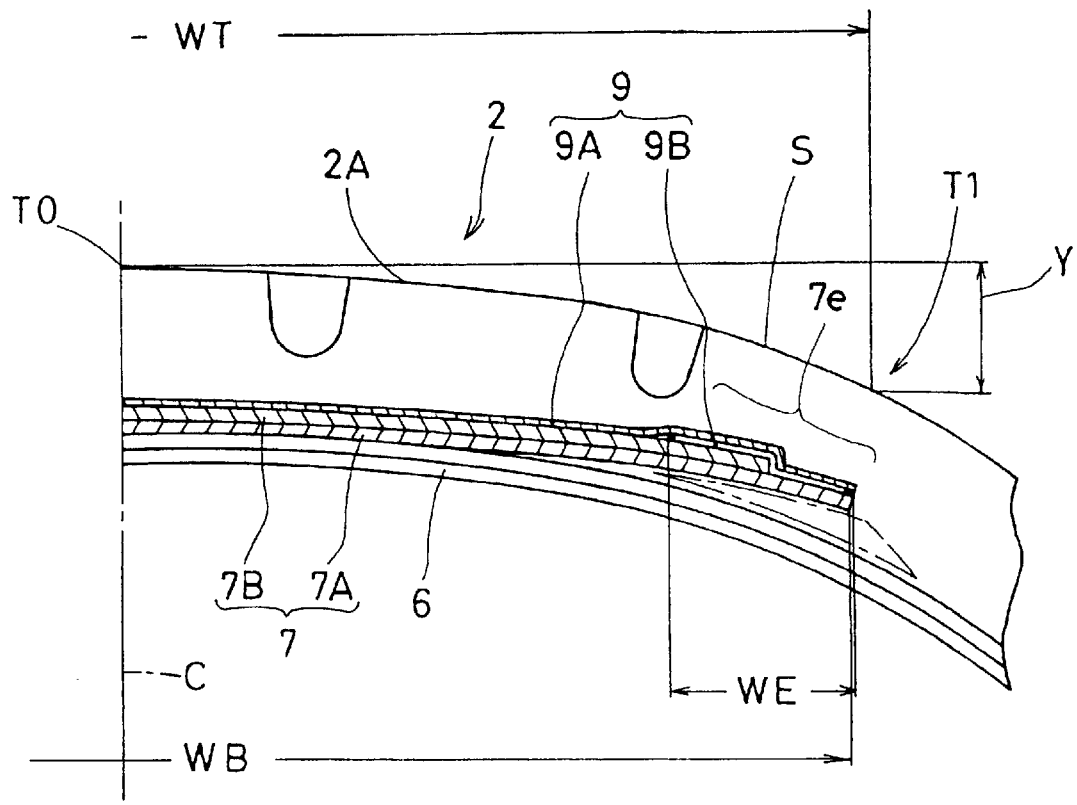
FIG. 2 is an enlarged cross-sectional view showing the tread part thereof.

| Tire | Ref. 1 | Ref. 2 | Ex. 1 | Ex. 2 | Ex. 3 | Ref. 3 |
|---|---|---|---|---|---|---|
| Band structure | FIG. 2 | FIG. 2 | FIG. 2 | FIG. 2 | FIG. 6 | FIG. 7 |
| Full-width band | | | | | | |
| Width (mm) | 200 | 200 | 200 | 200 | 200 | L1 = 150 |
| Cord material | nylon | nylon | nylon | nylon | nylon | nylon |
| Edge band | | | | | | |
| Width WE (mm) | 25 | 25 | 25 | 25 | 25 | L2 = 25 |
| Cord material | nylon | aramid | aramid | hybrid aramid 1000 d & nylon 840 d | aramid | aramid |
| Test results | | | | | | |
| High speed durability | 3 | 2 | 3 | 3 | 3 | 3 |
| High speed cornering | 250 km/h 15 min | OK | OK | OK | 280 km/h 5 min | 250 km/h 15 min |
|  | *1 | *2 | *3 | *4 | *5 | *5 |

Camber quantity Y: 4.5 mm
Ground contacting width WT: 176 mm
Carcass: a single ply of 1670 d/2 polyester cords
    Cord angle: 90 degrees to tire equator
Breaker: two cross plies of 1 × 3/0.27 steel cords
    Cord angle: +24 & −24 degrees to tire equator
    Inner ply width: 200 mm (= WB)
    Outer ply width: 197 mm
Tire size: 225/50R16
Section width W: 225 mm OK: The tire run completely at 280 km/h for 20 minutes.
*1: A breaker edge loose extending to the radially inside of the edge bands occurred and the tread was bulged out.
*2: Upon cut open inspection, a breaker edge loose of max. 4 mm extending to the radially inside of the edge bands was found.
*3: Upon cut open inspection, a breaker edge loose of max. 3 mm extending to the radially inside of the edge bands was found.
*4: No damage was found upon cut open inspection.
*5: A breaker edge loose extending to the radially outer surface of the edge bands occurred and the tread was bulged out.

I claim:

1. A pneumatic radial tire comprising:

a tread portion, a pair of sidewall portions, a pair of bead portions, each with a bead core therein, a radial carcass extending between the bead portions through the tread portion and sidewall portions and being turned up around the respective bead cores, a breaker belt disposed radially outside the carcass and inside the tread portion and comprising at least two cross plies of high elastic modulus cords laid at an inclination angle of from 15 to 30 degrees with respect to the tire equator, and a band belt disposed radially outside the breaker belt and comprising a full-width band and a pair of axially spaced edge bands, wherein the full-width band is made of low tensile elastic modulus organic fiber cords arranged substantially parallel to the tire equator, the full-width band and the breaker belt having substantially the same width, wherein the edge bands are made of high tensile elastic modulus organic fiber cords arranged substantially parallel to the tire equator, wherein the width of each of the edge bands is between 13% and 26% of a tread portion ground contacting width.

2. The pneumatic radial tire according to claim 1, wherein the edge bands are disposed radially inside the full-width band.

3. The pneumatic radial tire according to claim 1, wherein the low tensile elastic modulus organic fiber cords have a tensile elastic modulus of less than 1000 kg/sq.mm and the high tensile elastic modulus organic fiber cords each comprise a first organic fiber strand having a tensile elastic modulus of not less than 1000 kg/sq.mm twisted together with a second organic fiber strand having a tensile elastic modulus of less than 1000 kg/sq.mm.

4. The pneumatic radial tire according to claim 1, wherein the low tensile elastic modulus organic fiber cords have a tensile elastic modulus of less than 1000 kg/sq.mm and the high tensile elastic modulus organic fiber cords have a tensile elastic modulus of not less than 1000 kg/sq.mm.

* * * * *